A. P. BROOKE.
Improvement in Glass-Presses.
No. 129,095.   Patented July 16, 1872.
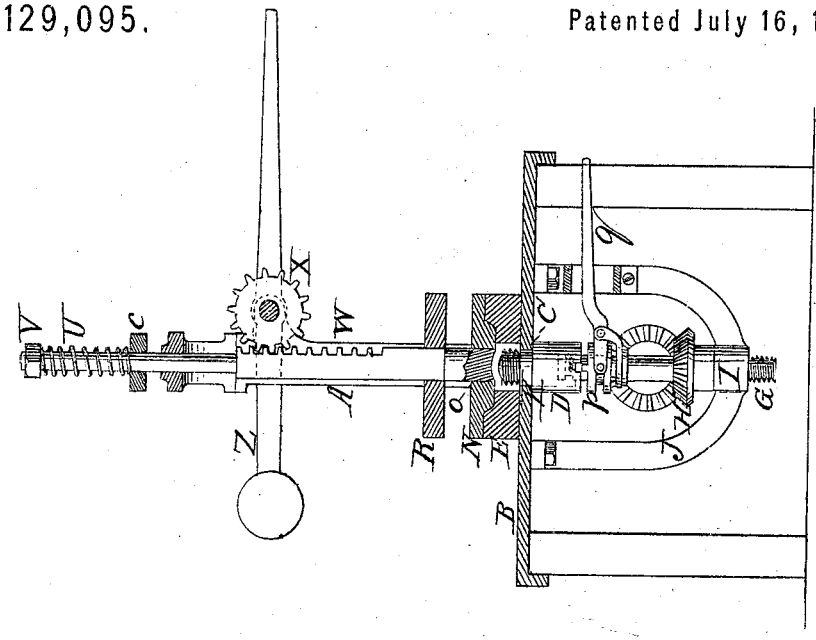
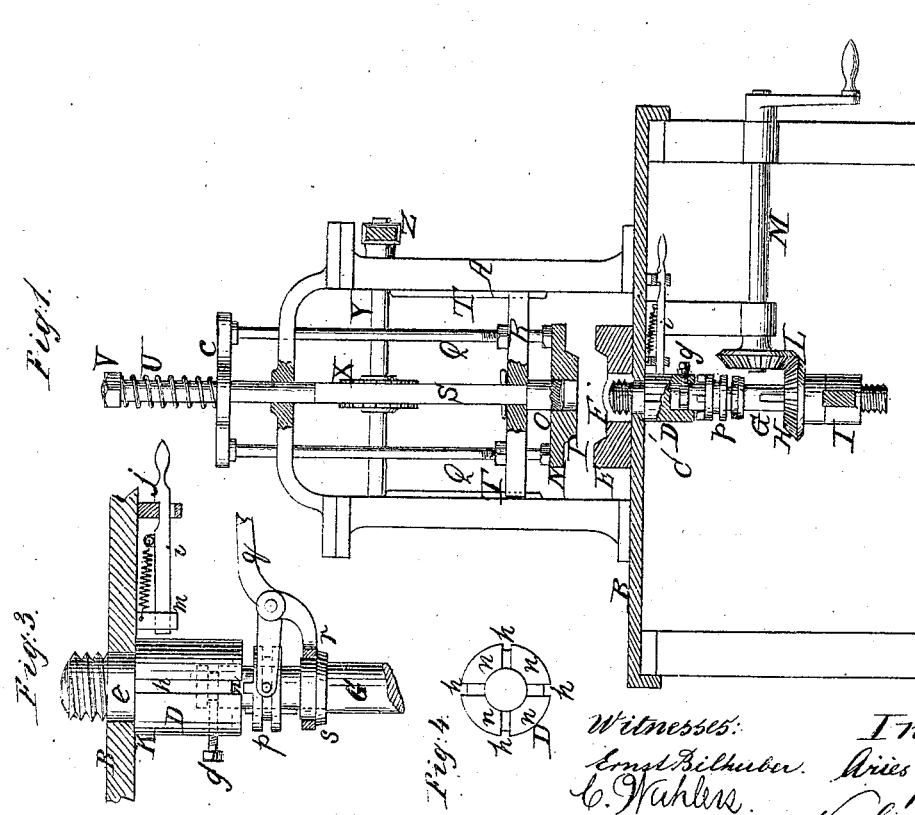
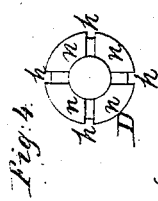

UNITED STATES PATENT OFFICE.

ARIES P. BROOKE, OF NEW YORK, N. Y.

IMPROVEMENT IN GLASS-PRESSES.

Specification forming part of Letters Patent No. 129,095, dated July 16, 1872.

*To all whom it may concern:*

Be it known that I, ARIES P. BROOKE, of the city, county, and State of New York, have invented a new and Improved Process for Making Articles of Glass or other Material; and I do hereby declare the following to be a full, clear, and exact description thereof, which will enable those skilled in the art to make and use the same, reference being had to the accompanying drawing forming part of this specification, in which drawing—

Figure 1 is a front elevation, partly in section, of a machine by which I will illustrate my invention. Fig. 2 is a side view thereof. Fig. 3 is a separate view of the rising-and-falling mandrel and its connections. Fig. 4 is an inverted plan of the bottom of the mandrel taken in the plane $x\ x$ of Fig. 3.

Similar letters indicate corresponding parts.

This invention relates to pressing or molding articles of glass or other material; and consists in a new process of molding such articles, and also in mechanism for carrying out such process. It is applicable both to plain work and to articles which are to have screw-threads formed in them. The mold in my process consists of a plate with a hole through it of the size and shape of the articles to be made, the thickness of the plate corresponding to the height of the article. This plate may be divided and its parts hinged to each other like the molds in common use, if desired, so that it can be opened to remove the article after it has been made. A hole is made through the table of the press a little less in diameter than that in the mold-plate, and the mold-plate is placed upon the table in such a position that the axes of both orifices coincide.

The articles produced by my process are made with their open sides downward, the upper part, as formed in the press, being that which is solid or closed, although my process can also be used for making articles hollow throughout or open at both ends. On the under side of the table of the press I arrange a vertical mandrel, whose upper end works up through the table into the mold and forms a core, around which the socket or hollow part of the article to be produced is formed.

When making articles with an internal screw-thread the upper end of the mandrel is threaded, and the shank of the mandrel provided with a screw of the same pitch as its threaded end and placed in a threaded sleeve, so that the revolution of the mandrel will cause it to rise or fall according to the direction of rotation. The top or core of the mandrel passes up through the opening in the table into the mold to the proper position, so that the neck or part of the mandrel below the top or screw will occupy the opening in the table, thereby stopping up that opening and forming a barrier to the escape of the metal or glass when "gathered" in the mold. The diameter of the top or core of the mandrel is less than that of the opening in the mold by the difference of the thickness of the article to be made. When the core of the mandrel is up in its place in the mold the metal or glass is "gathered" or placed therein, and the mold is then closed above by a ring-plate or follower and a "former," which are pressed down so as to shape and form the upper part of the article to be molded and force the metal or glass to conform to the core of the mandrel in the mold.

My invention also embraces a peculiar construction of the mandrel and the spindle on which it is mounted, whereby I can at pleasure cause the mandrel to rise and fall without or with rotary motion.

The letter A designates a press supported on a suitable frame and provided with a table, B, having an opening, C, through it of sufficient size to allow the core of the mandrel D, hereinafter described, to work up through it. The letter E designates a mold provided with a mold-opening, F, made entirely through it, the size and shape of such opening and the thickness of the plate varying of course with the article to be made therein. The mold is placed on the table, so that the axes of their openings coincide or so that the core of the mandrel can pass up into the mold to form the interior of the article to be molded.

The mandrel, which, in the example of my invention here shown, is constructed to form a fruit-jar cover, with an internal screw-thread, is formed or mounted on the upper end of a vertical screw-spindle, G, which passes through the hub of a bevel-gear, H, to which it is connected by a feather-key that permits the spindle to have longitudinal motion through the hub, but compels it to revolve with said gear. Below the bevel-wheel H the screw-spindle G passes through a stationary threaded sleeve or nut, I, which is supported by a frame, J, its threads causing the spindle to rise or fall, according to the direction of rotation. The extent of vertical motion allowed to the mandrel D is limited and controlled by a suitable stop, consisting, in this example, of a shoulder, K, formed below the threaded end of the mandrel, and so arranged as to come up against the bottom of the table of the press, when the mandrel has reached the proper point in the mold, and guides may be arranged beneath the table to guide the mandrel in its motion. The diameter of the threaded end or core $a$ of the mandrel is such, that it will readily pass up through the opening in the table without binding, and when in position in the mold, as shown in the drawing, the neck $b$ of the mandrel occupies the opening in the table, and prevents the glass or metal from escaping when deposited or "gathered" in the mold. The bevel-gear H is driven by the bevel-pinion L, fixed on a shaft, M, to which motion is imparted in any convenient manner. The press A, above the table, is provided with a ring-plate or follower, N, through which works a "former," O, both of which, in connection with each other, act to cover the top of the mold-opening in the mold, and form the upper surface of the article to be molded. The bottom of the ring-plate or follower is formed with an annular boss, P, which fits in a corresponding depression on the top of the mold, and it is provided with rods Q Q which work through the cross-bar R and through the top of the frame, and are connected to each other above the frame by a bar, $c$, through which extends the spindle of the "former," as hereinafter described.

The "former" consists of a block or piece of metal, whose lower end is of suitable shape to form the contour of that portion of the article in the mold with which it comes in contact. The spindle S of the "former" extends up through the cross-bar R, to which it is secured, so that they move together, the ends of the cross-bar being arranged to work up and down in vertical guides T T arranged in the sides of the frame. The spindle S extends up through the top of the frame and through the bar $c$, above which it is surrounded by a spiral spring, U, one end of which rests on the top of the bar $c$, while the other end is confined by a nut, V, on the upper end of the spindle. The back of the spindle is provided with a rack, W, which is engaged by the teeth of a pinion, X, fixed on a rock-shaft, Y, to which the balanced lever Z is connected in such a manner that by operating the lever the "former" can be raised or lowered to the extent required. The ring or follower is lifted by means of the ascent of the "former," and is also held up by the action of the guiding cross-bar R on the rods Q Q, which rods pass through said cross-bar R and are provided with adjustable nuts $d$, so arranged that the top of the cross-bar R comes in contact with the nuts when the "former" is raised, and the follower is consequently lifted with the "former" off the mold-plate. When the lever is brought down the follower strikes the mold first, and the further descent of the lever Z causes the "former" to move down through the follower and press upon the glass in the mold, so as to cause the "metal" to conform to the shape and threads of the core of the mandrel. It will be observed that when the lever Z is released, the spring U raises the former up in the follower to about the position shown in Fig. 1.

When the press is to be used the ring-plate or follower and "former" are held up off from the mold, and the mandrel is raised in the mold in the required position to form the socket of the article which is to be molded, and so that its neck $e$ occupies the opening in the table; the glass or material to be molded is then placed in the mold, the follower and "former" lowered upon it and pressed in the mold by means of the lever Z. The mandrel is then screwed out of the mold, the "former" and the follower are raised, and the mold shoved to one side on the table by its handle and the article made in it lifted out or dropped out; or if the article is of such a form as to require a divided mold, the mold is thrown open as in the case of ordinary hinged molds.

It is obvious that my process is applicable to plain pressed work where the socket or interior of the article to be produced is plain, and in that case the mandrel is plain, and is worked by a lever up and down without rotary motion, in the manner plain plungers are now worked.

My invention also embraces a mode of moving the mandrel up into the mold and withdrawing it therefrom, either with or without rotary motion; and in carrying out this part of my invention I bore out the under part of the body of the mandrel D centrally, as shown in Fig. 1, where that part of the mandrel is seen in section; and as shown in dotted lines in Figs. 2 and 3, to receive the upper end of the spindle G, which is provided with a circular groove, $f$, into which projects a set-screw, $g$, which is inserted through the side of the mandrel in such a manner as to allow the mandrel and spindle to turn independently of each other, but compel them to move together vertically. The outside of the mandrel has vertical grooves $h\ h$, two or more of which are engaged by a spring-bolt, $i$, so arranged under the table B that it can be at pleasure moved in or out of said grooves by the operator, and it is held out by the shoulder $j$ near its end catching on the edge of one of the brackets $m$, in which it moves. When the bolt is sprung into any of the grooves $h$ it is evident that the mandrel will be compelled to move vertically in the direction of such grooves. In order to impart a rotary motion to the mandrel, which is required to be done in withdrawing it when a core with a screw-thread is used, I form radial grooves $n$ on the lower end of the mandrel to receive the teeth of a ring-clutch, $p$, mounted loosely upon the spindle G, and operated by means of a lever, q, and ring-bracket, r, as will be clearly understood from the drawing, the ring-bracket being mounted loosely on the spindle and resting on the shoulder s. When it is desired to give rotary motion to the mandrel, the bolt i is pulled back and locked, as shown in the drawing, and the clutch is then caused to engage with the mandrel, so that the latter will turn with the screw-spindle.

It is obvious that the threads of the screw-spindle G and those on the core of the mandrel must be of the same pitch.

I do not wish to restrict myself to glass or molten material in applying my invention, as it can be used with plastic material worked without the aid of heat.

One of the advantages of my process is that articles of glass made by it are not so liable to crack and "shrend" as in the present method, the parts which are first exposed to the atmosphere after the article is molded being the thicker parts, and the thinner parts and the rims of the article are kept longest protected from the air.

In the present mode of making articles of glass in molds by pressing and blowing, the rim and thinner parts are first exposed to the atmosphere after making, while the thicker parts are inclosed away from the air in the lower parts of the molds, and the unequal cooling and contraction which ensue cause cracks and "shrending" in the article.

What I claim as new, and desire to secure by Letters Patent, is—

1. In combination with a mold for pressing glass from below, a screw-plunger, operating through the bottom of the mold, in the manner shown, and for the purpose set forth.

2. The screw-spindle G, turning independently within the mandrel D, in combination with the vertical grooves h and locking-bolt i, substantially as described.

3. The screw-spindle G, turning independently within the mandrel D, in combination with the radial grooves n and clutch p, substantially as specified.

ARIES P. BROOKE.

Witnesses:
 J. VAN SANTVOORD,
 E. F. KASTENHUBER.